G. W. STORMS.
COUPLING RING FOR CORRUGATED CULVERTS.
APPLICATION FILED JUNE 2, 1909.
930,103.
Patented Aug. 3, 1909.
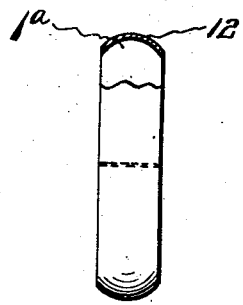
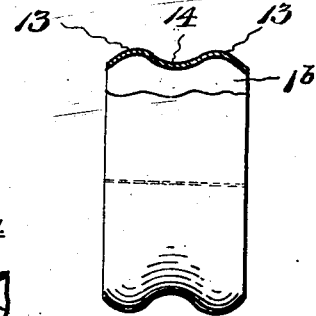
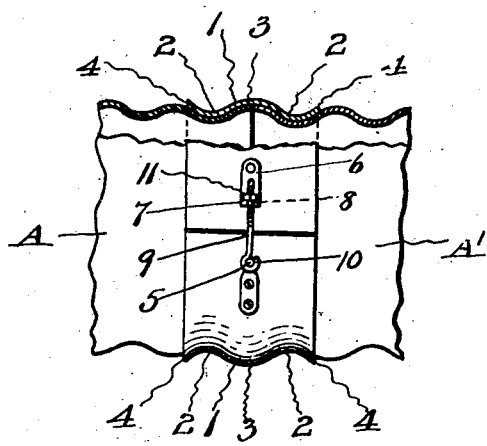
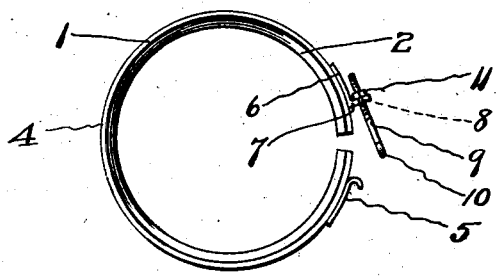
WITNESSES
INVENTOR:
George W. Storms
by James K. Polk
Attorney

UNITED STATES PATENT OFFICE.

GEORGE W. STORMS, OF LOUISVILLE, KENTUCKY.

COUPLING-RING FOR CORRUGATED CULVERTS.

No. 930,103.

Specification of Letters Patent.

Patented Aug. 3, 1909.

Application filed June 2, 1909. Serial No. 499,746.

*To all whom it may concern:*

Be it known that I, GEORGE W. STORMS, a citizen of the United States, and a resident of Louisville, in the county of Jefferson and State of Kentucky, have invented certain new and useful Improvements in Coupling-Rings for Corrugated Culverts, of which the following is a specification.

My invention relates to devices for coupling the adjacent ends of corrugated pipes used for culverts, and has for its object the provision of an open coupling-ring formed of sheet metal and provided with a fastening device to clamp the two ends of the ring together, consisting of a hook member on one end of the ring and a perforated clip on the other end having a threaded eye-bolt mounted in the perforation to be secured to said hook and a nut on the threaded stem to draw the ends of the ring together.

My improvement will be described in detail hereinafter, and illustrated in the accompanying drawings, in which—

Figure 1 is a view of two fragments of a corrugated culvert coupled by one form of my coupling-ring; Fig. 2, an edge view of the ring before being secured on the lengths of pipe; Fig. 3, a side view of a modification showing the ring made with but a single corrugation; and Fig. 4, a similar view of another modification in which two corrugations are employed.

In the drawings similar reference characters indicate corresponding parts throughout all of the views.

Corrugated metal culverts such as shown in Fig. 1, and indicated by characters A and A' are employed in carrying surface streams across wagon-roads, beds of electric and steam railroads, etc., and are made in standard lengths. When necessary to use more than one length of the corrugated tubing to cross a road-bed, it has heretofore been the practice to provide the additional lengths of tubes with split ends that will fit the tubular end of an adjacent length and provide the split end with a threaded clamp to secure the split end in place. This construction has not only been demonstrated to be expensive, but in shipping the tubes the clamps are liable to be broken or parts lost or the split ends of the tubes broken in handling so that the use of this coupling means has been found to be undesirable.

My invention contemplates the employment of separable rings indicated at 1 in Figs. 1 and 2, 1ª in Fig. 3, and 1ᵇ in Fig. 4, made of the same sheet metal as the tubes, but with the ends of the strip left disconnected, so that the ring is open to admit of it being placed around the meeting end of the tube before being secured thereon.

The form shown in Figs. 1 and 2 is constructed with two complete concave corrugations 2, and leaving a convex corrugation 3 in the middle of the ring with the edges of the ring flared upwardly, as shown at 4. The tubes are formed with concave corrugations adjacent to each end so that in placing the ring shown in Figs. 1 and 2 in place one of the corrugations 2 mates with the concave corrugation at one end of the tubes, say A, and the other corrugation 2 with the corrugation at the adjacent end of the other tube A'.

To secure the ends of the coupling-ring together so as to make a water-tight joint between the tubes A and A', I provide a clamp consisting of a hook 5, secured to one end strip, forming the coupling-ring, and a clip 6, adjacent to the other end of the strip, with a laterally extending lug 7, having a hole 8 therein.

9 indicates a threaded bolt slidably mounted in the hole 8 and having a loop or eye 10 on its end to engage hook 5 and a nut 11, mounted on the threaded stem that engages lug 7.

When the coupling-ring is placed in position, as shown in Fig. 1, and the loop or eye 10 is engaged by hook 5, the ring may be clamped on the ends of tubes A and A' by screwing the nut 11 up on the stem of the bolt 9, and thus form a water-tight joint and hold the two tubes securely together, end to end.

In the form shown in Fig. 3 the ring is formed with but a single convex corrugation 12, this form being the most economical because of the use of but one-half of the material shown in Fig. 1, the ends of the tubes when engaged by this form of coupling-ring being secured within the single corrugation.

In the form shown in Fig. 4, the ring is formed with two convex corrugations 13 and an intermediate concave corrugation 14. When this form is used the ends of the tubes will be clamped by the corrugations 13 and spaced apart the width of the intermediate corrugation 14. This latter form of ring is useful when the total lengths of the tubing is too short to reach the length to be drained if laid end to end, the "stretch" permitted by the space between the ends of the tubes represented by the width of the intermediate corrugations contributing to lengthen the joined tubes the extent desired.

Having thus described my invention, what I claim, is—

1. A pipe-coupler consisting of an open ring, a hook adjacent to one end of the ring, an eye-bolt slidably mounted on the other end of the ring to engage said hook, and means mounted on the bolt to draw the two ends of the ring together, substantially as shown and described.

2. A pipe-coupler consisting of an open ring, a hook adjacent to one end of the ring, a clip secured to the other end of the ring and having a perforated lug, a threaded bolt slidably mounted in the hole in the lug and having a loop on one end to engage said hook, and a nut mounted on the bolt and engaging said lug, substantially as shown and described.

3. In combination with corrugated tubing laid end to end, an open ring of corrugated material fitting over the meeting ends of the tubing, the corrugations of the ring mating with the corrugations of the tubing, a hook adjacent to one end of the ring, a clip secured to the other end of the ring and having a perforated lug, a threaded bolt mounted in the hole in the lug and having a loop on one end to engage said hook, and a nut mounted on the bolt and engaging said lug, substantially as shown and described.

In witness whereof, I have hereunto set my hand in presence of two subscribing witnesses.

GEORGE W. STORMS.

Witnesses:
J. G. WATERMAN,
W. T. QUICK.